(12) United States Patent
Sharma

(10) Patent No.: US 11,510,431 B2
(45) Date of Patent: Nov. 29, 2022

(54) SPIRULINA INFUSED GUMMIES AND METHOD OF PREPARING THE SAME

(71) Applicant: Amit Sharma, New York, NY (US)

(72) Inventor: Amit Sharma, New York, NY (US)

( * ) Notice: Subject to any disclaimer, the term of this patent is extended or adjusted under 35 U.S.C. 154(b) by 116 days.

(21) Appl. No.: 16/383,596

(22) Filed: Apr. 13, 2019

(65) Prior Publication Data

US 2019/0313683 A1 Oct. 17, 2019

(51) Int. Cl.
| | |
|---|---|
| *A23L 33/135* | (2016.01) |
| *A23L 29/231* | (2016.01) |
| *A23L 29/30* | (2016.01) |
| *A23P 30/10* | (2016.01) |
| *A23L 29/00* | (2016.01) |

(52) U.S. Cl.
CPC .......... *A23L 33/135* (2016.08); *A23L 29/035* (2016.08); *A23L 29/231* (2016.08); *A23L 29/30* (2016.08); *A23P 30/10* (2016.08); *A23V 2002/00* (2013.01); *A23V 2200/10* (2013.01); *A23V 2200/15* (2013.01); *A23V 2200/228* (2013.01); *A23V 2200/30* (2013.01); *A23V 2250/032* (2013.01); *A23V 2250/202* (2013.01); *A23V 2250/5072* (2013.01); *A23V 2250/61* (2013.01); *A23V 2300/24* (2013.01)

(58) Field of Classification Search
CPC .... A23L 33/135; A23L 29/035; A23L 29/231; A23L 29/30; A23P 30/10
USPC ................................................ 426/573, 577
See application file for complete search history.

(56) References Cited

U.S. PATENT DOCUMENTS 5,932,273 A    8/1999    Yasui

OTHER PUBLICATIONS http://www.pacificpectin.com/2015recipes/12Toes Sour Confectionary Gummy Candies Recipe Flyer.pdf "Sour Confectionary Gummy Candies Recipe" 1 page Mar. 14, 2015; date verified by Archive.org (Year: 2015).*
Internet Article: Earth to Amy, "Sour Spirulina Gummy Bears", Dec. 11, 2015, retrieved from URL: https://goo.gl/BscFBN) teaches healthy Spirulina gummy bears which mask the bad taste of Spirulina.
Internet Article: Camilla Saulsbury, "Recipe: Fruit Endurance Gel Blocks", Oct. 24, 2013, Retrieved from URL:https://goo.gl/1J6VGX) teaches Spirulina infused pectin gels and method of preparing the same.
Geoff Tablot, "Science and Technology of Enrobed and Filled Chocolate, Confectionery and bakery products", Woodhead Publishing Limited and CRC Press LLC, 2009, p. 147-149.
India Patent Office—First Examination Report for Application No. 201811014310 for Amit Sharma (Applicant), Report dated Dec. 29, 2020.

* cited by examiner

*Primary Examiner* — Jyoti Chawla
(74) *Attorney, Agent, or Firm* — Richard A. Ryan

(57) ABSTRACT

Spirulina infused gummies containing micronutrients for consumption by a person to deliver beneficial and necessary nutrients to the person and a method of preparing spirulina infused gummies to eliminate the bad odor and taste normally associated with spirulina. The gummies have pectin, water, citric acid, sugar and/or glucose and spirulina. Preservatives and flavor additives can also be included. The method of making the gummies includes heating a mixture of citric acid and water, adding pectin and sugar to the mixture and then stirring, adding hot glucose to the mixture, stirring the mixture and allowing the mixture to cool, adding spirulina to the mixture followed by continuous stirring, adding additional citric acid to the mixture, stirring until jellification begins, pouring the mixture into molds and removing the mixture from the molds when cool. Preferably, a preservative and a flavor additive are added to the mixture prior to the additional citric acid.

5 Claims, 2 Drawing Sheets

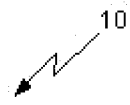

| INGREDIENT | QUANTITY BY WEIGHT PERCENTAGE |
|---|---|
| PECTIN 14 | 2.5% |
| WATER 16 | 16.5% |
| CITRIC ACID 18 | 2.9% |
| SUGAR/GLUCOSE COMBINATION 20 | 70.5% |
| SPIRULINA 22 | 6.6% |
| PRESERVATIVE 28 | 0.5% |
| FLAVOR ADDITIVE 30 | 0.5% |

FIG. 1

COMPOSITION FOR FIRST STEP 32:

| INGREDIENT | QUANTITY |
|---|---|
| PECTIN 14 | 20 gm |
| SUGAR 24 | 100 gm |
| WATER 16 | 300 gm |
| CITRIC ACID 18 | 4 gm |
| GLUCOSE 26 | 700 gm |

COMPOSITION FOR SECOND STEP 34:

| INGREDIENT | QUANTITY |
|---|---|
| SPIRULINA 22 | 60 gm |
| PRESERVATIVE 28 | 0.1 gm diluted in 0.5 ml water |
| FLAVOR ADDITIVE 30 | 2.5 ml |
| CITRIC ACID 18 | 25 gm |

FIG. 2

SPIRULINA INFUSED GUMMIES AND METHOD OF PREPARING THE SAME

CROSS-REFERENCE TO RELATED APPLICATIONS

This patent application claims priority to India Patent Application No. 201811014310 filed Apr. 14, 2018.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACKGROUND OF THE INVENTION

A. Field of the Invention

The present invention relates generally to compositions which are configured to deliver necessary nutrients to humans and methods of making such compositions. In particular, the present invention relates to such compositions and methods that utilize ingredients which contain micronutrients that are beneficial to humans and which are prepared in a manner that makes the composition easily and enjoyably consumable by people, especially children. Even more particularly, the present invention relates to such compositions and methods which contain spirulina and which are prepared in a manner so as to eliminate the bad odor and taste normally associated with spirulina.

B. Background

Despite the many improvements in agricultural production and the availability of food in some parts of the world, malnutrition is one of the most severe crises throughout the world. As per several statistical reports, malnutrition affects not less than one in four children around the world. In fact, malnutrition is a major health issue that has a negative, daily impact on some children. As well known to persons who generally treat malnourished people, chronic malnutrition is more lethal and more extensive than short term acute malnutrition.

In one manner, malnutrition can be defined as insufficient, excessive and imbalanced consumption of nutrients. A person's poor or improper diet causes sub-nutrition, whereas excessive calorie intake leads to over-nutrition, both of which are a result of an imbalance of nutrition and calorie in his or her diet. The World Health Organization reports that malnutrition, particularly sub-nutrition, is the largest contributor to child mortality. The report also concludes that the absence of vitamin A, zinc and other micronutrients during pregnancy leads to underweight births and can also cause intra-uterine growth restrictions.

Research concludes that malnourished children usually face health and educational problems in their adulthood. Malnutrition is directly associated with mortality and morbidity resulting from a variety of diseases, including diarrhea, malaria and other communicable diseases, which could be otherwise controlled by a person having a stronger immunity system. Although malnutrition can be easily treated with supportive nutrition balance and drug regimen, the major challenge is to identify and provide such nutrition to the malnourished child on time. As well known, the best way to transmit the necessary nutrients to a child is to provide the child with food that is nutritionally fortified to avoid the likelihood the child will have issues with malnutrition.

Globally, malnutrition is a serious issue, and developing nations bear the brunt of this challenging public health issue. Many of those who are fortunate enough to reside in wealthy nations are able to access an abundance of healthful foods. However, even struggling residents of global superpowers may face issues of malnutrition. The effects of malnutrition are certainly a matter of concern. For instance, iron deficiency can result in stunted growth, cognitive impairment and reproductive harm. Vitamin A deficiency can result in poor immunity, blindness, or even death in children. Anemia (iodine deficiency) causes developmental disabilities, goiters, and other health issues.

The problems caused by malnutrition go beyond individual health issues. Nations with high rates of malnutrition are likely to face an uphill battle when it comes to cultural and economic development, as well. Nutrient-dense, renewable food sources are one of the most effective tools for combating malnutrition. As described below, spirulina fits both of these criteria.

Spirulina is a well known blue-green algae that is heavily loaded with micronutrients which are required for humans. More specifically, spirulina is a spiral-shaped, multi-celled organism that utilizes light, warmth and water to produce a wide variety of essential nutrients. In fact, spirulina is one of the most nutritionally dense foods on earth. By weight, spirulina is about 60% protein. While protein deficiency is not a major problem for most people in the first world, persons who live in developing countries often have a difficult time obtaining enough good quality protein. The protein in spirulina is complete, which means it contains all nine of the essential amino acids not produced by, but necessary for, the human body. Spirulina is also rich in minerals such as iron, chromium, and potassium, fatty acids and vitamins, including B12, A, K1, and K2. In short, spirulina has all the nutrients necessary to make global malnutrition a historical footnote. The benefits of spirulina are so potent, it provides health and nourishment to nearly every single organ and bodily function.

Spirulina is generally categorized as "superfood" and recommended by WHO to help combat malnutrition. In fact, researchers have proved that a daily intake of one to three grams of spirulina powder can help in maintaining nutritional fitness in humans. Specifically, spirulina contains iron, protein, carbohydrate vitamins, magnesium, potassium, manganese in an amount that is beneficial for the nutritional health of a human body. A tablespoon of spirulina contains a small amount of fat (approximately 1 gram), including both omega-6 and omega-3 fatty acids in about a 1.5 to 1 ratio. Many people consider spirulina to be the single most nutritious food on Earth. In addition, spirulina has all the essential amino acids that the human body needs. Spirulina is also a good source of protein, having gram per gram more protein than beef, poultry, fish, and soybeans. Also, the quality of the protein in spirulina is considered to be excellent, comparable to eggs. Research supports that conclusion that spirulina has both antioxidant and anti-inflammatory properties and that it modulates a person's immune response, which would help reduce the likelihood that a person would be easily infected with communicable diseases.

Though raw spirulina in the form of capsules and tablets are presently available, the strong odor and bad taste associated with spirulina is a major issue with regard to the consumption of these capsules and tablets on a regular basis, by both children and adults. The strong odor and bad taste associated with spirulina is often particularly disliked by children and expectant mothers. Because of the beneficial qualities of spirulina, there is a need for a new form of spirulina product that is able to mask the bad taste and strong odor of the raw form of spirulina. In particular, there is a need to process raw natural spirulina into a form that is much easier to consume, and therefore more likely to be consumed, without affecting the nutritive value of spirulina. Furthermore, there is a need of new form of taking spirulina that is more likely to be acceptable, even liked, by people, specially young children. There is also a need for a process of preparing such a new form of spirulina that can mask the very disagreeable odor and taste of raw spirulina in a regular and repetitive manner.

SUMMARY OF THE INVENTION

The following presents a simplified summary of the disclosure in order to provide a basic understanding to the reader. As such, this Summary is not an extensive overview of the disclosure and it does not identify key/critical elements of the invention or delineate the scope of the invention. The sole purpose of this Summary is to present some concepts disclosed herein in a simplified form as a prelude to the more detailed description that is presented later. A more complete appreciation of the present invention and the scope thereof can be obtained from the accompanying drawings which are briefly summarized below and the following detailed description of the presently preferred embodiments of the present invention.

As will be readily appreciated by persons skilled in the art, the present invention provides the benefits and solves the problems that are identified above. That is to say, the present invention is directed to a new spirulina composition that is more appealing to people and a method of making that composition. More specifically, the present invention describes a spirulina infused gummy product that does not have the awful odor and taste that are normally associated with spirulina and a method of preparing spirulina infused gummies that eliminates the bad odor and taste of the spirulina. The spirulina infused gummies, having the bad odor and taste of the spirulina masked, will be much more acceptable, even liked, by people, specially young children, than the prior art forms of consuming spirulina. The present invention describes a method of processing raw natural spirulina into spirulina infused gummies that is much easier for people to consume and which does not affect the nutritive value of spirulina. The method of preparing spirulina infused gummies described herein masks the very disagreeable odor and taste of raw spirulina and is able to be prepared in a regular and repetitive manner.

In one embodiment of the present invention, the new spirulina infused gummies generally comprises the following ingredients: a quantity of pectin; a quantity of water; a quantity of citric acid; a quantity of sugar/glucose combination, with the sugar/glucose combination having a quantity of sugar and a quantity of glucose; and a quantity of spirulina. In a preferred configuration, the spirulina infused gummies also have at least one of a quantity of a preservative and a quantity of a flavor additive. The spirulina infused gummies are prepared by heating a mixture comprising the quantity of water and a portion of the quantity of citric acid to produce a first mixture, adding the quantity of pectin and the quantity of sugar to the first mixture to produce a second mixture, heating the quantity of glucose and adding the quantity of glucose to the second mixture to produce a third mixture, stirring the third mixture, allowing the third mixture to cool, adding the quantity of spirulina to the third mixture to produce a fourth mixture, continuously stirring the fourth mixture, adding the remaining portion of the quantity of citric acid to the fourth mixture to produce a fifth mixture, pouring the fifth mixture into a mold and removing the fifth mixture from the mold. In one configuration, the quantity of spirulina is approximately 6.6% by weight, the quantity of sugar/glucose combination is approximately 70.5% by weight and the quantity of citric acid is approximately 2.9% by weight. Preferably, the method of making the spirulina infused gummies also includes the step of occasionally stirring the fifth mixture until jellification prior to pouring the fifth mixture into the mold.

In another embodiment of the present invention, a method of preparing spirulina infused gummies generally comprises the steps of: (a) adding a first quantity of citric acid to a quantity of water to produce a first mixture; (b) heating the first mixture; (c) adding a quantity of pectin and a quantity of sugar to the first mixture to form a second mixture; (d) stirring the second mixture; (e) heating a quantity of glucose and adding the quantity of glucose to the second mixture to form a third mixture; (f) stirring the third mixture and allowing the third mixture to cool; (g) adding a quantity of spirulina to the third mixture to form a fourth mixture; (h) stirring the fourth mixture; (i) adding a second quantity of citric acid to the fourth mixture to form a fifth mixture; (j) pouring the fifth mixture into a mold and allowing the fifth mixture to cool in the mold; and (k) removing the fifth mixture from the mold. In the preferred configuration, the method also includes the step of adding at least one of a quantity of preservative and a quantity of flavor additive to the fourth mixture prior to the adding a second quantity of citric acid step. In one of the preferred compositions of preparing the spirulina infused gummies, the quantity of spirulina is approximately 6.6% by weight, the quantity of sugar/glucose combination is approximately 70.5% by weight and the quantity of citric acid is approximately 2.9% by weight. If utilized, the quantity of preservative can be approximately 0.5% by weight and the quantity of flavor additive can be approximately 0.5% by weight. In the preferred configuration, the method also includes the step of occasionally stirring the fifth mixture until jellification prior to the step of pouring the fifth mixture into the mold.

Accordingly, the primary object of the present invention is to provide a new and improved composition containing spirulina and method of preparing such a composition that eliminates the bad odor and taste associated with spirulina that has the advantages set forth above and which overcomes the disadvantages and limitations that are associated with presently available compositions having spirulina and forms of consuming spirulina.

It is an important object of the present invention to provide a new nutritional composition and method of preparing the composition that makes it much easier for people to consume spirulina that does not eliminate the micronutritional benefits associated with spirulina.

An important aspect of the present invention is that it provides spirulina infused gummies and a method of preparing spirulina infused gummies which accomplishes the objectives set forth above and elsewhere in the present disclosure.

Another important aspect of the present invention is that it provides spirulina infused gummies and a method of preparing spirulina infused gummies which completely masks the bad taste and odor of spirulina.

Another important aspect of the present invention is that it provides spirulina infused gummies and a method of preparing spirulina infused gummies which is able to provide the micronutritional benefits of spirulina in a form that is much easier for people, particularly children and expectant mothers, to consume on a regular basis.

Another important aspect of the present invention is that it provides a new spirulina infused gummy that, in one embodiment, comprises pectin, sugar, glucose, citric acid, glucose, spirulina, preservative and a flavor additive.

Another important aspect of the present invention is that it provides a new method of preparing spirulina infused gummies wherein citric acid, sugar, glucose, water, pectin, spirulina, preservative and flavor additive are heated until all the ingredients begin to melt, with the mixture being stirred occasionally until jellification starts and then, post jellification, the composition is poured in to molds of a desired shape.

Yet another important aspect of the present invention is that it provides spirulina infused gummies and a method of preparing spirulina infused gummies which, in a preferred configuration, is easy to consume and relatively inexpensive to manufacture.

As will be explained in greater detail by reference to the attached figures and the description of the preferred embodiments which follow, the above and other objects and aspects are accomplished or provided by the present invention. As set forth herein, the present invention resides in the novel features of form, construction, mode of operation and combination of processes presently described and understood by the claims. The description of the invention which follows is presented for purposes of illustrating one or more of the preferred embodiments of the present invention and is not intended to be exhaustive or limiting of the invention. The scope of the invention is only limited by the claims which follow after the discussion.

BRIEF DESCRIPTION OF THE DRAWINGS

In the drawings which illustrate the preferred embodiments and the best modes presently contemplated for carrying out the present invention:

FIG. 1 is chart showing one configuration of the ingredients for a spirulina infused gummy configured according to one of the preferred embodiments of the present invention;

FIG. 2 is a chart of the ingredients, and the quantity of the ingredients, of the first step and second step of a preferred embodiment of the method of preparing spirulina infused gummies of the present invention.

DETAILED DESCRIPTION OF THE PREFERRED EMBODIMENTS

Figure 3:
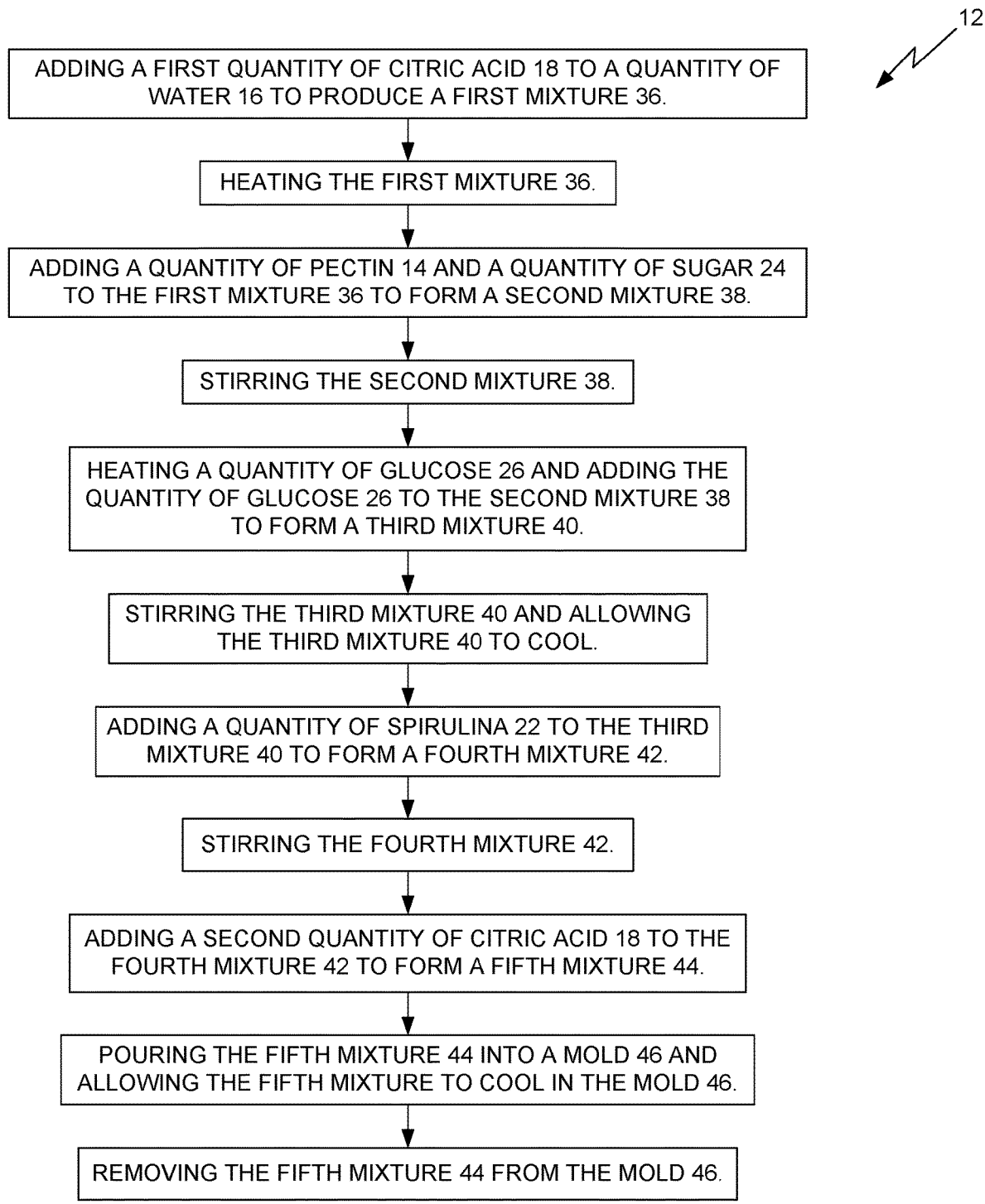
FIG. 3 is a flowchart of method for preparing spirulina infused gummies in accordance with an exemplary embodiment of the present disclosure.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting. For instance, the use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced item. Furthermore, the use of terms "first", "second", and "third", and the like, herein do not denote any order, quantity, or importance, but rather are used to distinguish one element from another.

With reference to the figures where like elements have been given like numerical designations to facilitate the reader's understanding of the present invention, the preferred embodiments of the present invention are set forth below. The enclosed figures are illustrative of one or more preferred embodiments and, therefore, are included to represent one or more different ways of configuring the present invention. Although specific components, materials, configurations and uses are illustrated, it should be understood that a number of variations to the components and to the configuration of those components described herein and shown in the accompanying figures can be made without changing the scope and function of the invention set forth herein. For instance, although the description and figures included herewith generally describe and show particular materials, shapes and configurations for the new spirulina infused gummies, persons who are skilled in the art will readily appreciate that the present invention is not so limited. In addition, the exemplary embodiments of the present composition and method of preparing the composition are shown and described with only those components that are required to disclose the present invention. As such, although some of the necessary components for using the present invention may not be shown in the drawings or necessarily described below, these components are well known to persons who are skilled in the relevant art. As will be readily appreciated by such persons, the various elements of the present invention that are described below may take on any form consistent with forms which are readily realized by one of ordinary skill in the art having knowledge of gummies. In addition the spirulina infused gummies of the present invention can be provided in a wide variety of different flavors, sizes, colors and/or configurations.

A spirulina infused gummy that is configured pursuant to a preferred embodiment of the present invention is shown generally as 10 in FIG. 1. A method of preparing the spirulina infused gummies 10 is shown generally as 12 in FIGS. 2 and 3. As set forth above, the spirulina infused gummies 10 are of the present invention are utilized to easily and effectively provide a person 14 with a very good source of the micronutrients his or her body needs for the person to live, thrive and to be able to better resist contagious diseases.

The spirulina infused gummies 10 of the present invention generally comprises, in various percentages, pectin 14, water 16, citric acid 18, a sugar/glucose combination 20 and spirulina 22. The sugar/glucose 20 component is divided into two forms, sugar 24 and glucose 26, which may be combined in various combinations for the sugar/glucose combination 20. In a preferred configuration, as shown in the table of FIG. 1, the spirulina infused gummies 10 also comprise an appropriately selected preservative 28 and a flavor additive 30 (i.e., an artificial food flavor). In one formulation, the amount of these ingredients, by weight, is: pectin 14, approximately 2.5%; water 16, approximately 16.5%, citric acid 18, approximately 2.9%; sugar/glucose combination 20, approximately 70.5% and spirulina 22, approximately 6.6%. In this configuration, the sugar/glucose combination 20 can be divided to be approximately 33.65% sugar 24 and approximately 36.85% glucose 26. As will be readily appreciated by persons who are skilled in the art, the above described percentages are presented as one possible configuration for the new spirulina infused gummies 10 and that various modifications and adjustments to these percentages can be utilized without changing the scope of the present invention. As described above, the primary objective of the present invention is to incorporate spirulina 22 into a gummy type of product to produce a nutritional composition (i.e., the spirulina infused gummies 10) that incorporates spirulina 22 and the benefits thereof without the bad odor and taste that are associated with spirulina 22 in its natural form so that persons can easily and enjoyably improve their nutritional intake on a regular basis.

As set forth above, in various configurations of the present invention the spirulina infused gummies 10 of the present invention can be made without the preservative 28 and flavor additive 30. However, as will be readily appreciated by persons skilled in the art, these two ingredients do provide certain benefits with regard to using the preservative 28 to improve the ability to store and transport the spirulina infused gummies 10 and use the flavor additive 30 to make the spirulina infused gummies 10 more appealing to the consumer, particularly children and expectant mothers. If desired, for instance, the preservative 28 can be eliminated in favor of an increased amount of citric acid 18 (such as increasing the weight percentage of citric acid 18 to 3.4%). If one or both of the preservative 28 and flavor additive 30 are used, they should be of the food grade type.

In general, the weight range percentage of the primary ingredients for the spirulina infused gummies 10 (namely, the pectin 14, water 16, citric acid 18, sugar/glucose combination 20 and spirulina 22) can each be increased or decreased as may be necessary to take into account different sources of the ingredients, the manufacturing of larger or smaller batches of the final product and/or personal and regional preferences. For instance, in certain circumstances, each of the primary ingredients may be able to be increased or decreased by one percent or more, such that the pectin 14 can be 1.5% to 3%, the water 16 can be 15.5% to 17.5%, the citric acid 18 can be 1.9% to 3.9%, the sugar/glucose combination 20 can be 69.5 to 71.5% and the spirulina 22 can be 5.6% to 7.6%. Likewise, the preservative 28 and flavor additive ingredients 30 can be increased or decreased as desired for the reasons set forth above or to create particular brands of the new product.

With regard to the method 12 of preparing spirulina infused gummies 10, the method 12 is done in two steps, shown as first step 32 and second step 34 in FIG. 2. In the first step 32, water 16 and citric acid 18 are heated to a suitable temperature to produce a first mixture, shown as 36. Pectin 14 and sugar 24 are added to the first mixture 36 followed by continuous stirring to produce a second mixture 38. Heated glucose 26 is added to the second mixture 38 to produce a third mixture 40. The third mixture is stirred. In the second step 34, the temperature of the third mixture 40 is slightly cooled and then a predetermined quantity of spirulina 22 is added to the third mixture 40 to produce a fourth mixture 42. The resulting fourth mixture 42 is stirred continuously and then a preservative 28 and a flavor additive 30 are added, as may be desired or necessary. The fourth mixture 42 (with or without preservative 28 and flavor additive 30) is occasionally stirred and additional citric acid 18 is added to produce a fifth mixture 44 that will begin to jellify, which is to make the product gelatinous (i.e., jellification). At the onset of jellification, the fifth mixture 44 is poured in one or more molds 46, typically a plurality, to achieve the desired size and shape for the spirulina infused gummies 10. The fifth mixture 44 in the one or more molds 46 is then allowed to cool. Once the fifth mixture 44 is cooled, the product is removed from the molds 46 to produce the spirulina infused gummies 10.

The following example, which include a preferred embodiment of the method 12 of the present invention, will serve to illustrate the practice of this invention, it being understood that the particulars shown are by way of example and for purpose of illustrative discussion of preferred embodiments of the invention and is not intended to be taken restrictively to imply any limitation on the scope of the present invention. FIG. 2 illustrates the composition and process for preparing one kilogram of spirulina infused gummies 10, with the components divided up by the first step 32 and second step 34. Initially, four grams of citric acid 18 is poured into three hundred grams of water 26 and heated to a temperature of one hundred degrees Celsius, the resulting solution (first mixture 36) is allowed to settle for a while. To this solution, twenty grams of pectin 14 and one hundred grams of sugar 24 is added to produce the second mixture 38. The resulting second mixture 38 is stirred to form a buffer solution. This buffer solution is mixed with seven hundred grams of heated glucose 26 to produce the third mixture 40. This solution is stirred and heated, as necessary, to a temperature of 110 degree Celsius for a period of five minutes to produce the final composition of the first step 32. In the second step 34, the final composition of the first step 32, which is the third mixture 40, is cooled to a temperature at or near one hundred degrees Celsius and then sixty grams of spirulina 22 is added, followed by continuous stirring to ensure uniform distribution and to prevent any lumps, to produce the fourth mixture 42. After approximately fifteen minutes, any desired preservative 28 (i.e., 0.1 gram diluted in 5 ml of water) and/or flavor additive 30 (i.e., 2.5 ml) are added, followed by continuous stirring. The citric acid 18 for the second step 34 is added to the fourth mixture 42 to adjust the pH of the composition and produce the fifth mixture 44. The fifth mixture 44, the final composition, is occasionally stirred until jellification begins. As soon as jellification begins, the entire composition is poured into one or more molds 46 and the composition is allowed to cool and settle down. After the cooling of the fifth mixture 44 (i.e., the final composition), the product is removed from the molds 46 to produce the spirulina infused gummies 10.

As set forth above, some of the major advantages of the present invention include the fact that the above method 12 of producing a nutritional composition (spirulina infused gummies 10) that contain needed and beneficial micronutrients available from spirulina 22 that is completely free from the natural bad taste and odor of the spirulina 22. As a result, the spirulina 22 becomes much more favorable for regular consumption. Because gummies are generally very popular among children, the spirulina infused gummies 10 are also likely to be very popular among children and, as a result, will help in eradicating malnutrition among children. Expectant mothers and other adults will also be able to acquire the benefits of spirulina 22 without having to suffer through the bad taste and odor that is normally associated with spirulina 22. The spirulina infused gummies 10 prepared by the above stated method 12 will have optimum dosage of spirulina 22 with regard to nutrients that are beneficial to or required by humans.

While there are shown and described herein specific forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape and use. For instance, there may be numerous components of the embodiments described herein that can be readily replaced with equivalent functioning components to accomplish the objectives and obtain the desired aspects of the present invention.

The various embodiments set forth herein are intended to explain the best mode of making and using the present invention as currently known to and appreciated by the present inventor and to enable other persons who are skilled in the relevant art to make and utilize the present invention. Although, the described embodiments may comprise different features, not all of these features are required in all embodiments of the present invention. More specifically, as will be readily appreciated by persons who are skilled in the art, certain embodiments of the present invention only utilize some of the features and/or combinations of features disclosed herein. As such, the specification and drawings are, accordingly, to be regarded as illustrative rather than restrictive. In addition, it will be recognized by persons skilled in the relevant art that the terms "comprising," "including," and "having," as they may be used herein, are specifically intended to be read as open-ended terms of art.

What is claimed is:

1. A spirulina infused gummy, comprising:
   a quantity of pectin in an amount of 2.5% by weight of the total weight of said spirulina infused gummy;
   a quantity of water in an amount of 16.5% by weight of the total weight of said spirulina infused gummy;
   a quantity of citric acid in an amount of 2.9% by weight of the total weight of said spirulina infused gummy;
   a quantity of sugar/glucose combination in an amount of 70.5% by weight of the total weight of said spirulina infused gummy, said sugar/glucose combination having a quantity of sugar and a quantity of glucose;
   a quantity of spirulina being between 5.6% and 7.6% by weight of the total weight of said spirulina infused gummy, said quantity of spirulina having a naturally strong odor and a bad taste;
   a quantity of preservative in an amount of 0.5% by weight of the total weight of said spirulina infused gummy; and
   a quantity of flavor additive in an amount of 0.5% by weight of the total weight of said spirulina infused gummy,
   wherein said spirulina infused gummy is prepared according to a method that is configured to mask the strong odor and the bad taste of spirulina in said spirulina infused gummy.

2. The spirulina infused gummy of claim 1, wherein said spirulina infused gummy is prepared by heating a mixture comprising said quantity of water and a portion of said quantity of citric acid to produce a first mixture, adding said quantity of pectin and said quantity of sugar to said first mixture to produce a second mixture, heating said quantity of glucose and adding said quantity of glucose to said second mixture to produce a third mixture, stirring said third mixture, allowing said third mixture to cool, adding said quantity of spirulina to said third mixture to produce a fourth mixture, continuously stirring said fourth mixture, adding the remaining portion of said quantity of citric acid to said fourth mixture to produce a fifth mixture, pouring said fifth mixture into a mold and removing said fifth mixture from said mold.

3. The spirulina infused gummy of claim 2 further comprising occasionally stirring said fifth mixture until jellification prior to pouring said fifth mixture into said mold.

4. The spirulina infused gummy of claim 1, wherein said spirulina infused gummy is prepared according to a method comprising the steps of:
   a) dividing said quantity of citric acid into a first quantity of said quantity of citric acid and a second quantity of said quantity of citric acid, adding a first quantity of said quantity of citric acid to said quantity of water to produce a first mixture;
   b) heating said first mixture;
   c) adding said quantity of pectin and said quantity of sugar to said first mixture to form a second mixture;
   d) stirring said second mixture;
   e) heating said quantity of glucose and adding said quantity of glucose to said second mixture to form a third mixture;
   f) stirring said third mixture and allowing said third mixture to cool;
   g) adding said quantity of spirulina to said third mixture to form a fourth mixture;
   h) stirring said fourth mixture;
   i) adding said second quantity of said quantity of citric acid to said fourth mixture to form a fifth mixture;
   j) pouring said fifth mixture into a mold and allowing said fifth mixture to cool in said mold; and
   k) removing said fifth mixture from said mold to produce said quantity of spirulina infused gummy, said spirulina infused gummy being prepared so as to mask the normally slimy taste and smell of spirulina in said spirulina infused gummy.

5. The spirulina infused gummy of claim 4 further comprising the step of adding at least one of a quantity of preservative and a quantity of flavor additive to said fourth mixture prior to said adding said second quantity of said quantity of citric acid step, said quantity of preservative being in an amount of 0.5% by weight of the total weight of said spirulina infused gummy and said quantity of flavor additive being in an amount of 0.5% by weight of the total weight of said spirulina infused gummy.

* * * * *